FIG. 1

INVENTOR
MAURICE C. FLEMING

INVENTOR
MAURICE C. FLEMING

INVENTOR
MAURICE C. FLEMING

May 7, 1963 M. C. FLEMING 3,088,448
FUEL INJECTION SYSTEM

Filed Jan. 21, 1959 8 Sheets-Sheet 4

INVENTOR
MAURICE C. FLEMING

May 7, 1963 M. C. FLEMING 3,088,448
FUEL INJECTION SYSTEM
Filed Jan. 21, 1959 8 Sheets-Sheet 5

INVENTOR
MAURICE C. FLEMING

INVENTOR
MAURICE C. FLEMING

May 7, 1963  M. C. FLEMING  3,088,448
FUEL INJECTION SYSTEM

Filed Jan. 21, 1959  8 Sheets-Sheet 8

INVENTOR

MAURICE C. FLEMING

United States Patent Office 3,088,448
Patented May 7, 1963

3,088,448
FUEL INJECTION SYSTEM
Maurice C. Fleming, 1013 23rd St. W., Bradenton, Fla.
Filed Jan. 21, 1959, Ser. No. 792,245
12 Claims. (Cl. 123—140)

This invention relates to improvement in fuel injection systems for liquid fuel burning engines, particularly fuel injection systems adapted to the intake manifold of internal combustion engines. However, the basic components of the fuel injection system which perform the tasks of distributing, control and metering of a fluid may be used in combination in numerous applications in many fields for fluid metering and control.

In conventional fuel injection systems, liquid fuel is pumped from fuel tank into intermittent distributor means which distributes the fuel under pressure to atomizing nozzles. The atomized fuel emitted from the nozzles is simultaneously mixed with air for proper combustion. The principal shortcoming of conventional metering distributors resides in their complexity and thus increased costs of manufacture and maintenance. In conventional distributors there is also no effective means of correlating an exact amount of fuel injected to the actual engine load in addition to compensation for speed.

The instant invention comprises in a fuel system having fuel supply and fuel return lines, a fuel supply pump, a metering distributor interconnected between fuel supply and fuel return lines, a distributor control piston in said fuel return line, a fuel return metering pump in said fuel return line varying the rates of return pumping as engine speed varies, and a return pump control operatively connected to the engine manifold, said return pump control varying the rates of return pumping according as the "engine load" varies. The metering distributor being of uniquely simple design is regulated by a distributor control piston to inject a constant amount of fuel per engine revolution, said amount being varied according as the engine manifold vacuum may vary. The result includes a fuel injection system which provides for accurate metering for starting, idling and all speeds under varying load conditions. High manifold vacuum during rapid deceleration cuts off all fuel except that required for idling.

Accordingly, it is an object of invention to provide a fuel injector of simple construction having no high tolerance parts, and which is inexpensive to manufacture and maintain.

Another object of invention is to provide a fuel injection system wherein accurate metering may be provided for starting and all speeds under varying load conditions, including idling.

Yet another object of invention is to provide a fuel injection system wherein variations in fuel quantity delivered by nozzle injection, caused either directly or indirectly by changes in engine speed and/or load, including variables such as discharge and flow characteristics, tend to be self-correcting.

Yet an additional object of invention is to provide a fuel injection system having exact metering of the basic fuel charge proportionate to the speed and load requirements of the engine.

Yet additional objects of invention will become apparent from this specification and the attached drawings wherein like numerals are taken to represent like elements.

The instant fuel injection system preferably operates under a relatively low pressure for injecting fuel into the intake manifold or intake valve port of an internal combustion engine. Alternatively fuel may be injected into the engine cylinder wall, if additional fuel pressure is developed.

Figure 1:
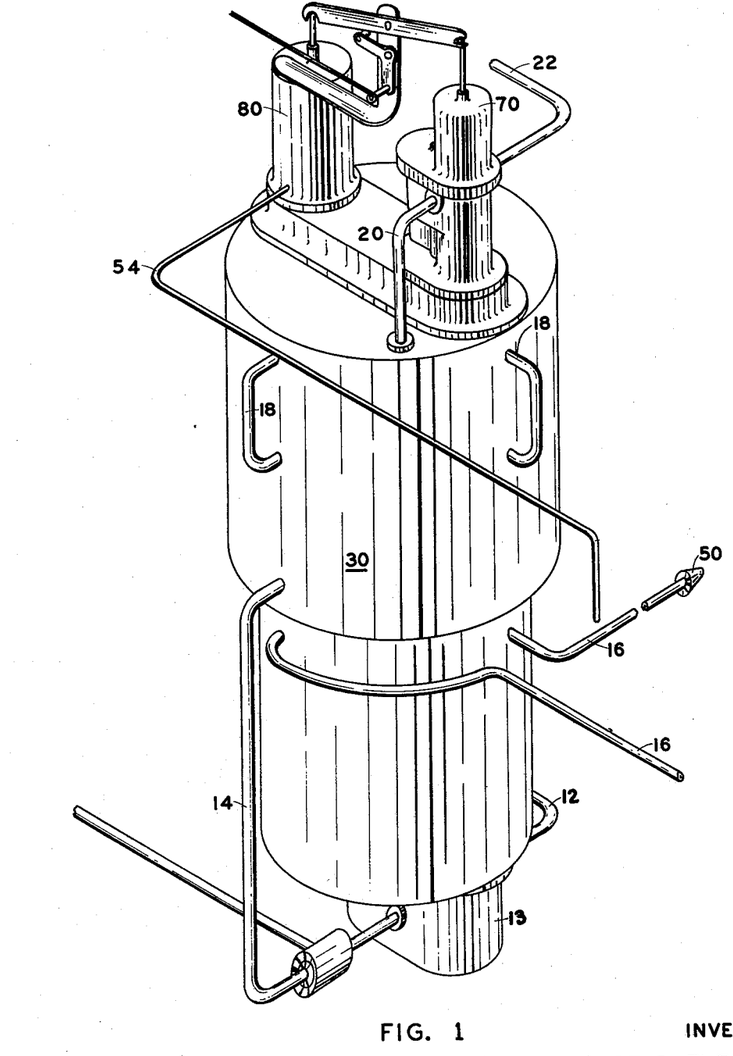
FIGURE 1 is an isometric view of a preferred form of invention.
Figure 3:
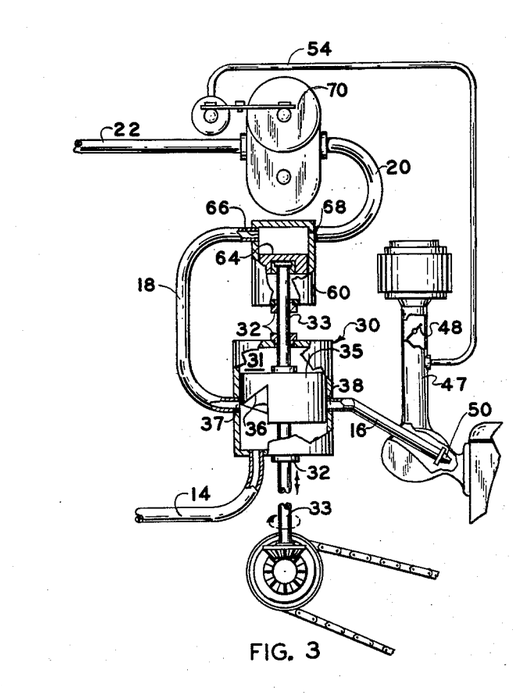
FIGURE 3 is a schematic view of a metering distributor, distributor control, fuel return pump and return pump control in relation to an engine manifold.

FIGURES 1 and 3 show the relative disposition of the invention to a conventional internal combustion engine.

Figure 2:
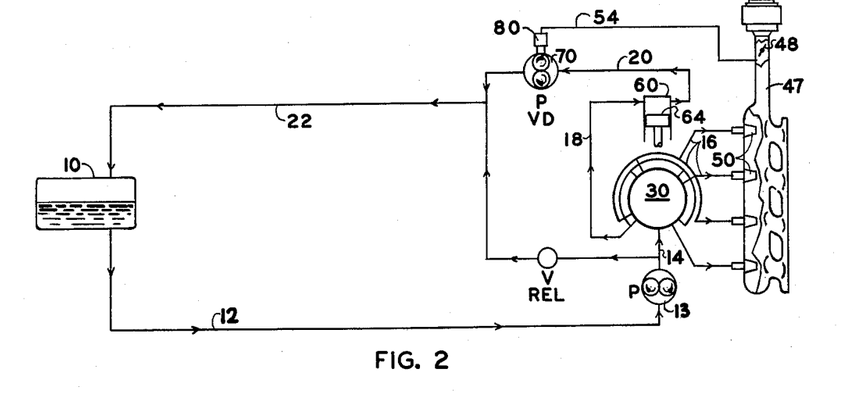
FIGURE 2 is a schematic view of the instant fuel injection system embodying fuel tank, fuel supply pump, metering distributor, distributor control, fuel return metering pump and control therefor.

As illustrated in FIGURE 2 fuel is pumped from fuel tank 10 through fuel line 12, by gear pump 13 through fuel supply line 14 and delivered under pressure to metering distributor 30. From distributor 30 fuel is forced through injection fuel line 16, injected through injection nozzle 50 and simultaneously a quantity of fuel is returned through fuel control line 18, distributor control 60, return pump fuel line 20, fuel return metering pump 70, regulated by return metering pump control 80, which is operatively connected to the engine manifold and finally through fuel return line 22. An extension of fuel line 20 may be designed to bypass return fuel pump 70, said extension intercepting fuel line 22 and containing a metering valve to provide fuel control for idling. Fuel pump 13 may be any type which will develop adequate fuel pressure; however, a constant delivery pump such as a gear pump is perhaps most satisfactory. A pressure relief valve may be employed to maintain an even discharge fuel pressure from fuel supply pump 13. Fuel return metering pump 70 may be any fluid evacuation mechanism which varies the discharge rate as a function of the engine speed and in which the discharge rate also may be varied by an additional control. In this instance the additional control is a vacuum cylinder 80 which is operatively connected to the engine manifold as shown. The functions of metering and distributing performed by distributor 30 may be separated and these functions may be accomplished separately by individual units designed for this purpose.

With respect to distributor 30, one injection port and one control port per engine cylinder are expected to give the best operating performance. For purposes of illustration there is thus shown and described one of each as in FIGURES 3–12 inclusive. The ports may vary in number from a minimum of one control and one injection port per injection system to a maximum of multiple injection ports per engine cylinder and of multiple control ports per distributor. Increasing the control ports 37 will diminish fuel pulsations in distributor control 60. These ports may be increased in number until a continuous or annular port may be developed. Fuel lines emanating from these ports may be joined together if desired in order to reduce the number of ports necessary in the control cylinder. If the ports are interconnected, either like ports, unlike ports or a combination of the two, a more continuous fuel flow will result for all such interconnected ports.

Figures 17, 18:
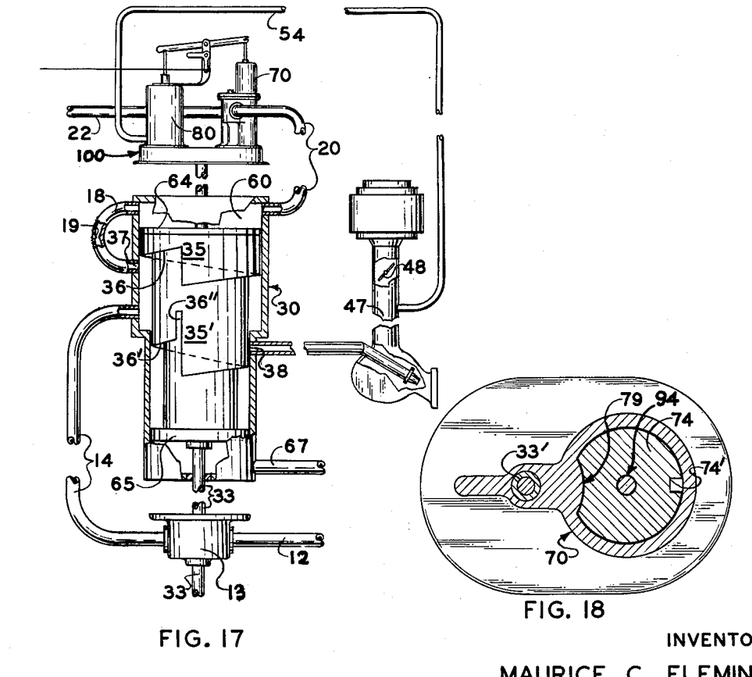
FIGURE 17 is an enlarged sectional view of a modified metering distributor housing compositely embodying fuel supply pump, metering distributor, distributor control piston, fuel return metering pump and return pump control in one housing.
FIGURE 18 is a sectional view, taken along section line 18—18 of FIGURE 13, and illustrates the surge slot and concave section in a lower piston seal for the driven gear of the instant fuel return metering pump.

The various components of the system may be assembled as one unit, as illustrated in FIGURES 1 and 17, or they may be assembled in any arrangement, or grouping which will perform satisfactorily and which may be in conformity with an engine compartment. The driven parts are intended to be operated at ½ engine speed; however, this ratio may be varied with or without design changes in the injection system to any figure necessary to obtain desired performance. The driven parts may be driven separately, in combination or in combinations, and they may be connected variously to operate at different speeds with regard to each other and/or the engine.

In FIGURE 3 metering distributor 30 is shown as having fuel intake conduit 14, injection port 38 and fuel control port 37. Manifestly, the metering chamber 31 has a number of injection ports, not illustrated, there being an injection port for each engine cylinder and one or more control ports. Within the metering chamber a peripherally and angularly slotted valve 35 is mounted upon an axially shiftable, rotatable power-control shaft 33. Manifestly, a non-axially shiftable power shaft might be employed within an axially shiftable control shaft with similar effect. Valve 35 is interposed between fuel injection port 38 and control port 37. Power-control shaft 33 is synchronized with the engine through connection with the crank shaft. With valve 35 the shaft 33 rotates at one-half engine speed. The shaft is shiftable axially so that slot 36 meters quantities of fuel for injection at 38 and return to control at 37. Slot 36 is cut in rotating valve 35 at an angle so that as valve 35 shifts axially while rotating at any given speed, the chamber ports will be uncovered for longer or shorter lengths of time and the fuel is correspondingly being metered through the respective ports. In the modification shown in FIGURE 3 having one rotating valve 35, ports 38 and 37 are directly opposite each other in distributor chamber 31.

Figure 21:
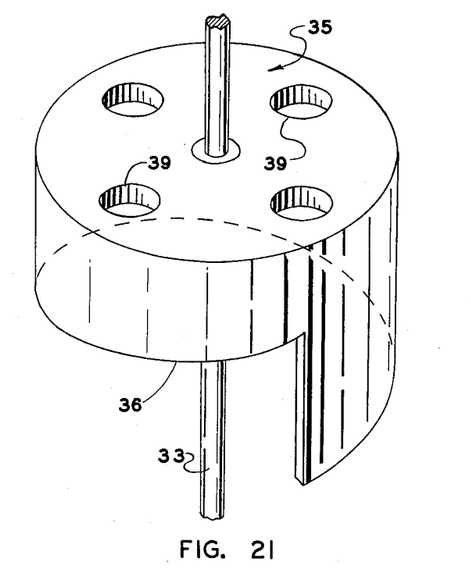
FIGURE 21 is an isometric view of a valve constructed in accordance with the invention.
Figure 22:
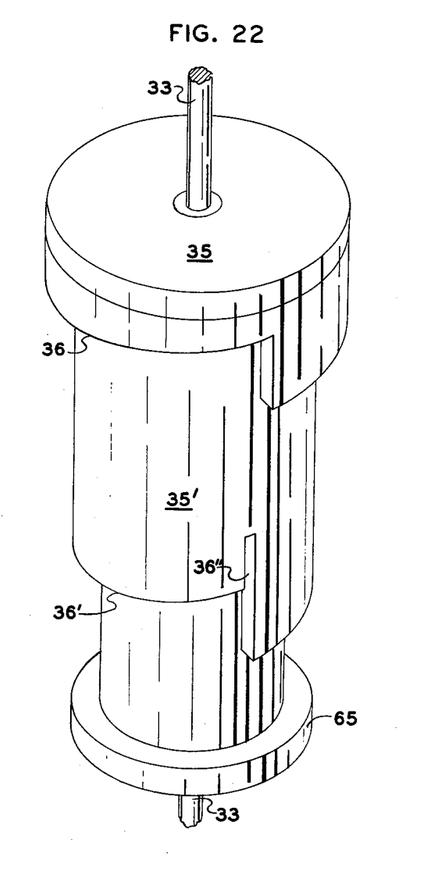
FIGURE 22 is an isometric view of modification of the valve of FIGURE 21.

In FIGURES 21 and 22 there are shown preferred forms of valve configuration. The basic valve 35 is adapted to reciprocable movement in chamber 31 and has a plurality of fuel flow orifices 39 disposed radially about its axis. The cut out 36 of each valve is of helical design as shown. The FIGURE 22 modification pertains to the valve of the FIGURE 17.

Figure 4:
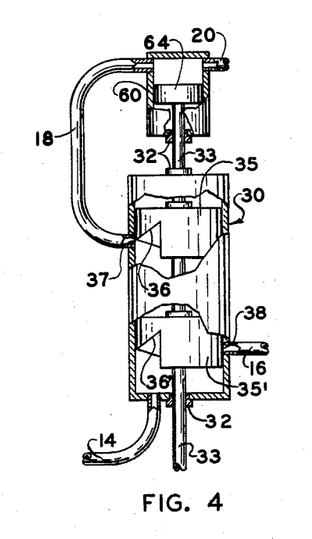
FIGURE 4 is a bi-valved modification of the metering distributor in FIGURE 3.

In the modification shown in FIGURE 4, two corresponding rotating valves 35, and 35' are rotatably mounted upon power-control shaft 33. In this modification control port 37 and injection port 38 are respectively opposite valves 35 and 35' for metering equal or proportionate quantities of fuel. In both FIGURES 3 and 4 modifications, distributor control 60 contains cylinder 62 and control piston 64 which is fixed upon an end of power control shaft 33 to control axial movement of shaft 33 and valve 35. The difference in the amount of fuel supplied to and discharged from control cylinder 62 causes axial movement of piston 64 and valves 35 and this also in turn meters amounts of fuel flowing through ports 38 and 37. Fuel is returned to tank 10 by means of fuel return metering pump 70. When a smaller quantity of fuel is delivered through control port 37 into control cylinder 62, than is removed by control meter 70, piston 64 and valve 35 rise accordingly, allowing a longer section of slot 36 to uncover injection ports 38 and control port 37. In operation, fuel flow increases until fuel flowing into cylinder 62 from port 37 balances the discharge of control pump 70. When fuel return pump 70 does not empty as much fuel as port 66 supplies to control cylinder 60, the action is reversed. Since slots 36 and 36' meter the fuel at control and fuel ports, the amount of fuel fed to respective nozzles 50 is always equal to or in direct ratio to the fuel discharged by fuel return metering pump 70. Thus undesired variations in fuel flow caused by variables such as flow and discharge characteristics will tend to be self-correcting. Predetermined variations in fuel injections and fuel return through ports 38 and 37 can be built into the system by using the bivalved modification as illustrated in FIGURE 4. By varying the contour slots 36 and 36' and the resulting discharge relationship between the two valves 35 and 35', any fixed variations of the fuel charge at different speeds and or load conditions may be obtained with great accuracy. As a result, fuel flowing to nozzles 50 may be increased or decreased more than fuel flowing to control cylinder 60. When two rotating valves are used or any of their variations, they may be fabricated from a continuous sleeve with the appropriate openings and, when so used, reduction in sleeve size is possible.

Figure 13:
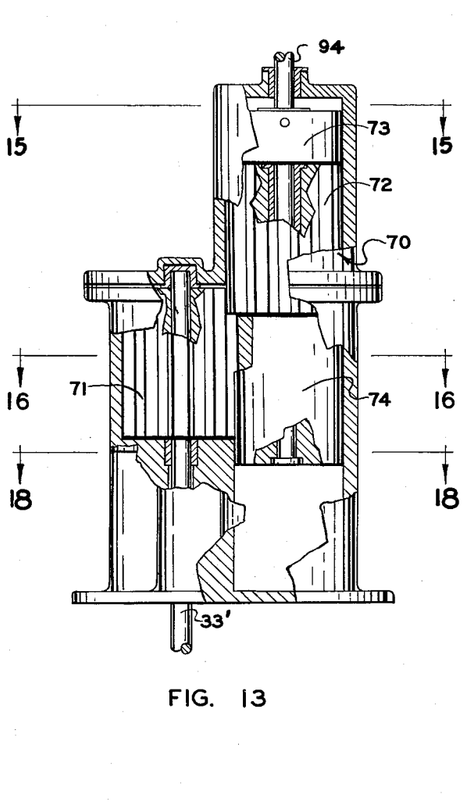
FIGURE 13 is an enlarged sectional view of a fuel return metering pump and driving and driven gears approaching a minimal pumping relationship.

If a small pump is used for fuel return metering pump 70, in which the discharge is a straight line function of the speed, then fuel charge per engine cylinder to nozzles 50 will always be the same irrespective of speed. Deviations which might occur in the discharge rate at low speed would tend to be either self correcting or easily compensable. However, fuel return metering pump 70 is able to compensate also for engine load variations. A gear pump 70 as illustrated in FIGURE 13 includes a driving gear 71, the driven gear 72 being fitted with piston seals 73 and 74 to prevent fuel recirculation. Seals 63 and 64 may be secured to rod 94 in any manner which is feasible or rod 94 may be made integral with either or both of the seals. A pressed fit is one simple and effective method of securing these parts. Movement of driven gear 72 varies the return pumping rate at any speed. It has been found that vacuum control of this return pumping rate is exceptionally effective, for with the engine speed constant intake manifold pressure varies closely with the engine load.

As the air intake manifold pressure varies with the load, vacuum control 80 gradually engages or disengages the gear axially. This movement varies the fuel charge for load but maintains the straight line function for speed.

Figure 19:
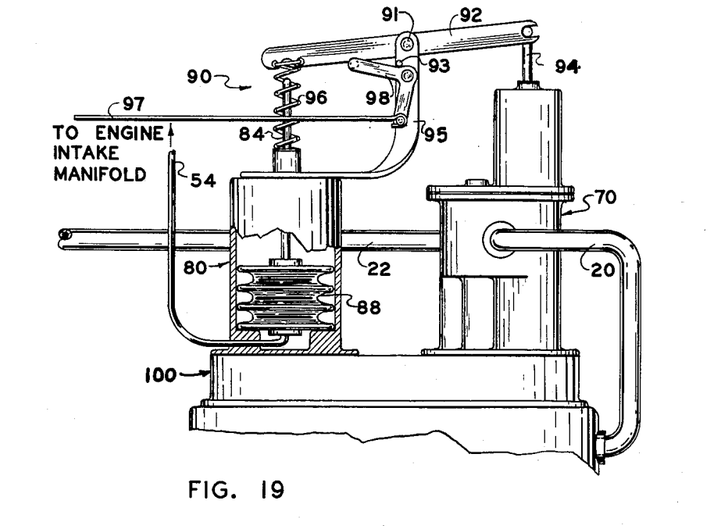
FIGURE 19 is an elevational view of fuel return metering pump linked to return metering pump control, the linkage being limitingly connected to the engine choke.
Figure 20:
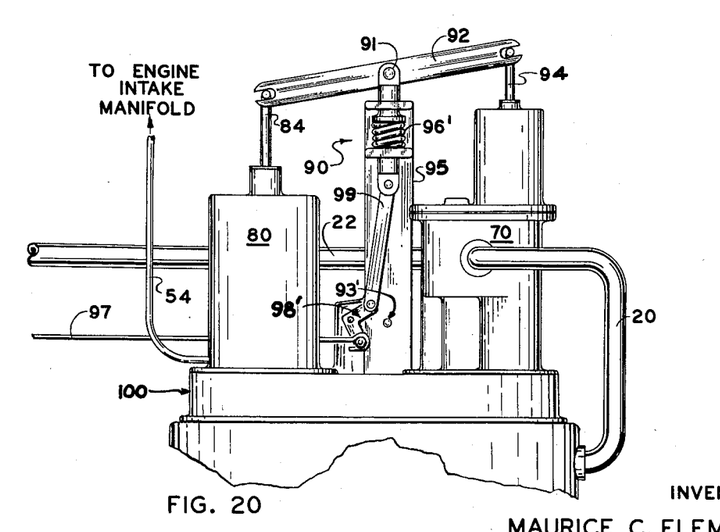
FIGURE 20 is an elevational view of a modification of FIGURE 20 wherein the engine choke limits the retarding pumping movement of linkage between return metering pump and return metering pump control.

As illustrated in FIGURES 19 and 20 a suitable engine fuel choke 90 may be linked to return metering pump 70 and vacuum control 80 to aid in starting the engine.

Two of several methods to link return fuel pump 70, vacuum cylinder control 80 and engine choke 90 are shown in FIGURES 19 and 20. In FIGURE 19 choke 90 is designed to stop the travel of linkage 92 so that the fuel flow will always be a minimum fixed amount per engine revolution. Return spring 96 is fastened to linkage 92 to return it to a position of contact with rod 84 of control 80, unless movement of linkage 92 is retarded by the bearing arm at the end of choke arm 98. Engine manifold vacuum moves rod 84 downwardly and a suitable compression element 88 within cylinder 82 returns it to upward position. Upward movement of choke arm 98 is limited by stud 93 attached to bracket 95.

In FIGURE 20 choke arm 98' raises or lowers through link 99 pivot 91 of linkage 92, adding a fixed amount of fuel to the normal fuel flow at all speeds. Compression spring 88 moves rod 84 upwardly while vacuum induces rod 84 to move downwardly. Movement of choke arm 98' is limited by studs 93'. Obviously, mechanical linkages using a governor may be substituted for vacuum cylinder 80 to regulate fuel return pump 70, but probably would not work as efficiently as the vacuum control means described. Vacuum control cylinder 80 may be mounted at right angles or any angle to return fuel pump 70 and connected by any linkage suitable. Other satisfactory linkages and/or spring arrangements may be used to obtain the required performance of fuel return pump 70 with regard to control 80. In certain instances a throttle connection may be included in the control linkage to aid in load and/or speed compensation. Through appropriate connection with existing linkage it can either add to, subtract from, resist or encourage the movement of road 94 by shifting or changing pressure on pivot 91 or the various linkages.

Figure 5:
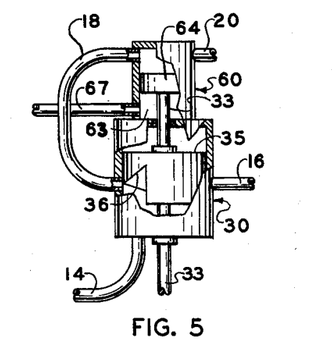
FIGURE 5 is a schematic view of a metering distributor and distributor control juxtapositioned.
Figure 6:
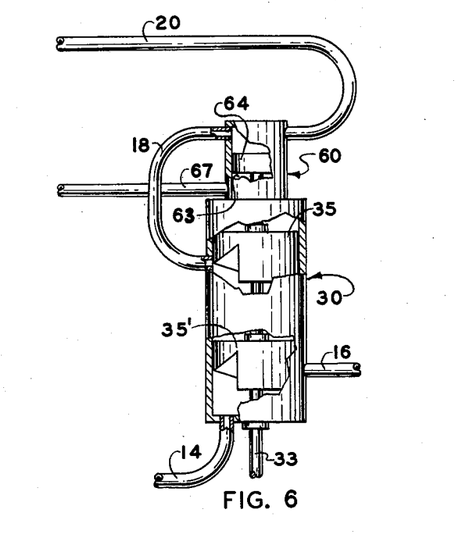
FIGURE 6 is a bi-valved modification of FIGURE 5.

In FIGURES 3 through 12 and 17, various modifications of invention are shown. Metering drives per se are not shown but normally such drives would consist of cam shaft engagement with extension of power control shaft 33 through the end of the distributor chamber 30, as best illustrated in FIGURES 1 and 17. Power-control shaft 33 is synchronized with the engine by connecting it cam shaft wise with the crank shaft. In FIGURES 5 and 6, the distributor control cylinder 62 is secured contiguous the distributor chamber 30. In these modifications, power-control shaft 33 extends through the distributor chamber into control cylinder 62. A fuel surge line 67 is directed from surge chamber 63 in control cylinder 62 into fuel return line 22. Control piston 64 may be free upon power-control shaft 33 so that the piston does not rotate with valve 35, but moves with it axially. Pressure in control cylinder 62 is determined by the difference in cross-sectional area of shaft 33 and the separate control shaft if one is used, under the arrangements shown in FIGURES 5 and 6.

In the invention modifications surge chamber 63 which is connected to fuel return line 22 through surge line 67 may also be vented to the atmosphere. In some applications a different pressure may prove advantageous in chamber 62, in which case surge line 67 may be connected to any line which has the desired pressure. If the distributor valves 35 and 35' develop a tendency to hunt, a restriction or orifice in surge line 67 will suffice to control these abnormal conditions.

Figure 7:
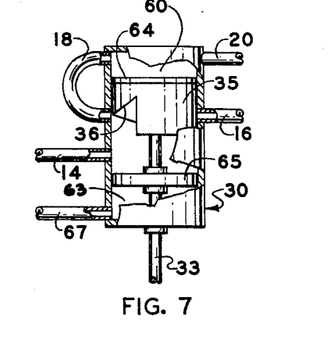
FIGURE 7 shows a further modification of invention embodying valve and counter balancing piston within the metering chamber.
Figure 8:
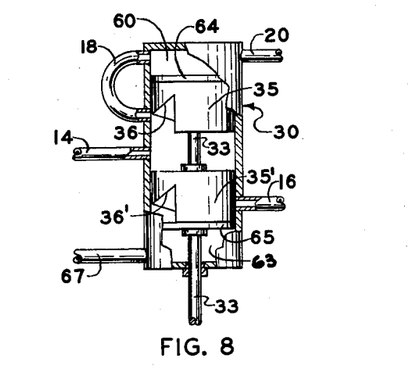
FIGURE 8 is a bi-valved modification of FIGURE 7.

FIGURES 7 and 8 illustrate yet another modification of invention wherein the control 60 is embodied as an upper control area of distributor chamber 30. Additionally, a surge area 63 is provided at the bottom of distributor chamber 30, surge line 67 again leading from said chamber to fuel return line 22. In this modification, piston 68 is fixed to the lower end of power-control shaft 33 and counter balances fuel pressure against the piston-like control end 64' of valve 35. Because of the weight of valve 35, pressure in control chamber 61 can be negative. With such "negative pressure" a different discharge characteristic of return pump 11 possibly can be obtained. In FIGURE 8 valve 36' is placed on top of and effectively takes the place of piston 65.

Figure 9:
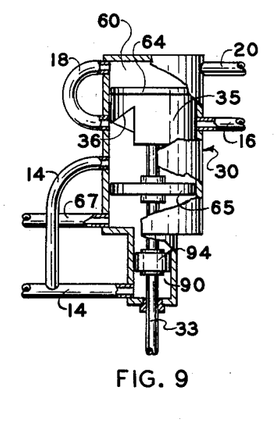
FIGURE 9 is a further modification embodying a distributor chamber with control area at one end thereof and, at the other end thereof, a metering valve counter balancing piston and a pre-control chamber with piston therein, fuel supply pressure urging a pre-control piston to increase or decrease pressure in the control area.
Figure 10:
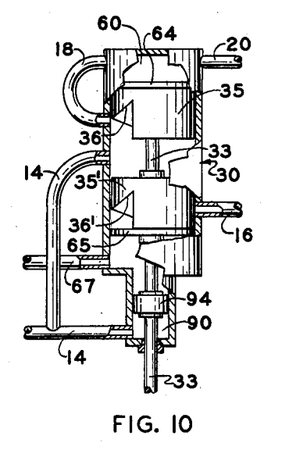
FIGURE 10 is a bi-valved modification of FIGURE 9.

In FIGURES 9 and 10 another modification of invention is shown wherein a supplementary control cylinder 40 and piston 42 are connected as shown. Fuel pressure from fuel supply pump 13 acts against the face of piston 42. This pressure and the area of control end 64' of valve 35 determine fuel pressure in control area 60. Cylinder 40 and piston 42 may be changed to put a negative pressure in distributor control 60.

Figure 11:
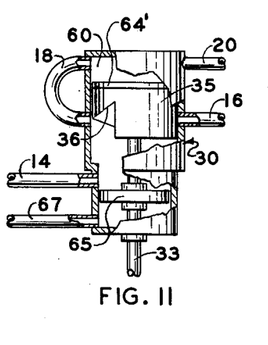
FIGURE 11 is a further modification of invention wherein the distributor chamber has a narrowed surge area.
Figure 12:
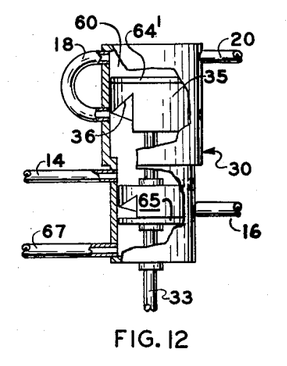
FIGURE 12 is a bi-valved modification of FIGURE 11.

FIGURES 11 and 12 are modifications of the construction of FIGURES 7 and 8. Here distributor piston 65 accommodating portion of the distributor chamber 30 is made smaller than the valve accommodating portion of the chamber and the piston 65 per se is correspondingly smaller. As a result, fuel pressure on the larger control area 64' of valve 35 will produce a positive pressure in control chamber 61. If a negative pressure is desired, the sizes of the valve and distributor piston may be reversed. The difference in sizes of valve control area 64' and piston 65 will determine the pressure in control chamber 61. In FIG. 12 valve 35' is placed on top of and effectively replaces piston 65.

Manifestly, in the invention and its modifications, a system of springs and/or weights may be used in connection with distributor 30 and control cylinder 62 to increase or decrease pressure in cylinder 62. Any of these methods will probably be less effective and more expensive than the means shown, however.

As will become apparent from the foregoing, fixed operating pressure in control cylinder 62 may vary over a range of positive and negative gradients depending upon modifications employed. The change in pressure in control chamber 61 will probably vary the discharge characteristics of return pump 70.

The fuel injection system shown in FIGURE 17 utilizes the principle of the modification of FIGURE 12, but has a redesigned valve which should perform better and also be easier to fabricate. The contour of metering slot 36 cut in valve 35 may be continued around the valve from the vertical cut off line from a minimum of a few degrees to a maximum of 360 degrees, depending upon the desired maximum period of fuel injection. If distributor valve 35 is driven at one-half engine speed, fuel may be discharged during the entire 720 degrees rotation of a four-cycle engine. As valve 35 is rotated clockwise, slot 36 will cut off fuel injection into each cylinder at a fixed and constant point in the engine's rotation, but the start of injection will be progressively earlier as the speed and the load increase and the valve is raised in the distributor housing. However, slots 36 and 36' may be designed to reverse this pattern, or vary the injection pattern in any manner desired. By varying the contours of slots 36 and 36' with respect to each other, the charge through injection port 38 may be made lean or enriched. An orifice 19 may be used in fuel control line 18 to simulate the fuel nozzle 50 in the intake manifold. This orifice 19 may be necessary to make identical the discharge characteristics for injection port 38 and control port 37.

Referring to FIGURE 17, power-control shaft 33 being synchronized with the engine through rotatable connection with the crank shaft, simultaneously turns gear pump 13, distributor valve 35, and fuel return metering pump 70. Valves 35 and 35' must be free to slide vertically on shaft 33. If desirable, these parts may be connected variously to operate at different speeds. It may prove necessary to elongate the smaller diameter surge area of distributor 30 and the rotating valve 35' assembly, so that all of slot 36' is in the smaller diameter surge area during operation. When slot 36' emerges into the distributor area of housing 30, it may cause a pumping action. Fuel is fed to slot 36' through slot 36". Seals (not illustrated) at the ends of valve 35 and 35' may be desirable to limit seepage. The seals may rotate with valves 35 and 35' or they may be free, not rotating, but sliding axially in distributor 30 while the valves 35 and 35' rotate separately. The preferred examples of the seals may be in the form of rings or they may be piston-like, similar to those employed with the return pump gears as shown in FIGURE 13. The distributor 30 should be mounted vertically as shown or on its side. If the distributor were inverted, valve 35 might creep axially when the engine is shut off resulting in flooding or starting.

In FIGURES 1 and 17 fuel return pump 70 and vacuum control 80 are shown mounted on casing 100 and fuel return pump 70 is offset from shaft 33. This allows for a more expanded view of the controls. With this type of mounting a power transfer device will be necessary in casing 100 to drive return pump shaft 33' from shaft 33. This device would be logically a gear train and could provide for varying the speed of shaft 33' relative to shaft 33. However, in practice it is anticipated this mounting will be simplified. Fuel return pump shaft 33' would be moved in line with and made an extension of shaft 33 and casing 100 with its gear train could be eliminated.

Figure 14:
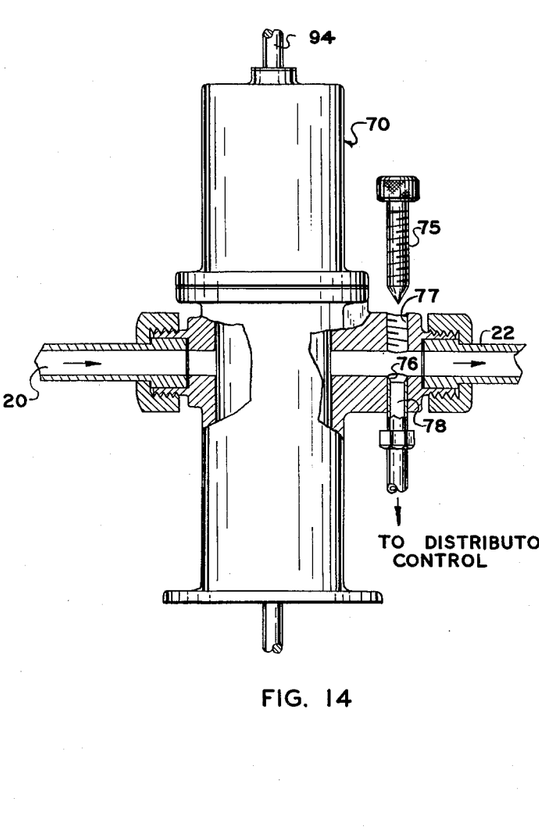
FIGURE 14 is a vertical section view of the return metering pump housing showing fuel inlet and return ports and needle valve control.
Figure 15:
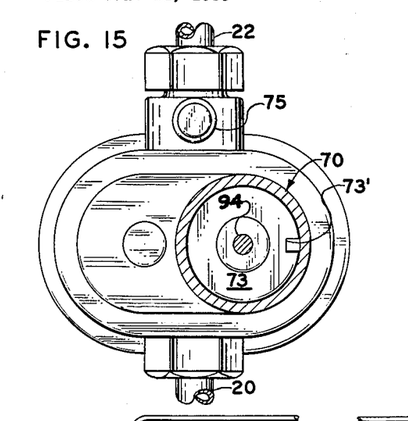
FIGURE 15 is a transverse sectional view taken along line 15—15 of FIGURE 13 showing positioning of return pump gear chamber and fuel line.
Figure 16:
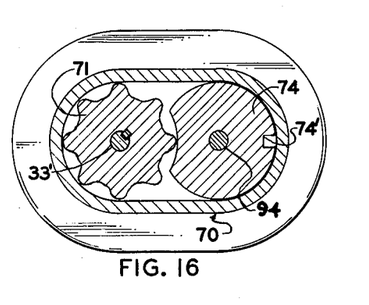
FIGURE 16 is a transverse sectional view taken along section line 16—16 of FIGURE 13.

The fuel return metering pump 70 is illustrated in FIGURES 13 and 14. Driving gear 71 and axially shiftable driven gear 72 operating in return pump fuel line 20 to pump fuel past needle valve 75 and idling needle valve seat 76 into fuel return line 22. Needle valve 75 is adjustably mounted in threaded bore 77. Passage 78 extends from needle valve seat 76 into distributor control cylinder 62. As gear 72 slides vertically with control rod 94, a longer or shorter length of the gear teeth mesh with gear 71 and proportionally vary the rate of fuel being pumped. Piston seals 73 and 74 may be employed at each end of gear 72 to prevent recirculation of fuel. Seepage in fuel return metering pump 70 will not be a major problem since the fuel pressure differential between return pump fuel line 20 and fuel return line 22 should be slight. A surge line is necessary between the chamber above piston seal 73 and the chamber below piston seal 74. Thus a surge slot 73' and surge slot 74' may be cut in piston seals 73 and 74 respectively as shown in FIGURE 13. For clarity fuel return line 22, needle valve 75, seat 76 and passage 78 are shown in FIGURE 14 only. These items together with the opposite fuel line 20 can be designed to fit on either side of return metering pump 70, depending on the direction of rotation of shaft 33'. In FIGURE 14, fuel line 20 from control cylinder 62 to fuel return metering pump 70 is shown as integral with the fuel return pump housing. Idling needle valve 75 allows fuel to flow between control cylinder 62 and the portion of fuel return line 22 between returning metering pump 70 and fuel tank 10. If fuel pressure is positive in control cylinder 62, flow is to that portion of fuel return line 22. This increase in flow for idling also may be accomplished by using an adjustable mechanical stop (not shown) to hold valve 35 slightly open. This latter method may prove superior when control chamber 61 is designed to have a negative fuel pressure as, for example, illustrated in the modifications of FIGURES 7 and 8. Tolerances are moderately close between gear 72 and the seals 73 and 74 to prevent recirculation. A bushing means or shoulders machined on rod 94 are two of the various spacing media which may be used to insure the required distance is maintained between seals 73 and 74.

The return fuel pump may be used also as a fuel pump. Fuel delivered to the engine would vary directly with pump speed and variably with the control rod setting.

If inertia of fuel in injection fuel line 16 to the nozzle 50 becomes a problem, the injection system might include a heater for vaporizing the fuel in injection fuel line 16. A supplementary source of heat such as an electric heater could be used for starting and early operation or for continuing operation. Heat from the exhaust manifold could be used for operation after the engine had warmed. An orifice (not illustrated) similar to orifice 19 in control line 18 may be placed in fuel line 16 to aid in fuel control. This may be necessary either using or not using nozzle 50 in fuel line 16 and with or without orifice 19 in line 18. The orifice should be close to injection port 38 and ahead of the vaporizing heater. Thus, fuel flow through injection port 38 and control port 37 would be balanced. Vaporizing the fuel would have the advantage of nearly eliminating fuel inertia in injection fuel line 16 and the vaporized fuel would mix completely with the air in the intake manifold.

An additional advantage of this system is the substantial reduction in the probability of undesired fuel vaporization in the unit or "vapor lock" occurring. As referred to previously a certain amount of fuel is continuously recirculated. This will constantly carry heat from the unit and also prevent a temporary rise in temperature which may occur with an intermittent fuel flow. The resulting cooling effect will reduce the incidence of "vapor lock."

Auxiliary equipment such as a fuel filter is not shown. Auxiliary equipment may aid in the proper functioning of the system but is not vital to the system's performance. Such equipment may be employed wherever the need is indicated.

A diaphragm and chamber may be substituted for a piston and cylinder at any point in the invention where the change is applicable.

Having thus described my invention and without intent to limit myself to the preferred examples herewith shown and described, I claim:

1. In a fuel supply system having a fuel reservoir tank with supply and return lines connected thereto, a device for metering the amount of fuel delivered to a combustion engine comprising a fuel distributor connected to said supply line, said distributor having first and second outlet ports, movable means within said distributor for proportionately controlling the amount of fuel delivered to said first and second outlet ports, supply means connecting said first port to said combustion engine, flow control means connected in said return line between said second port and said reservoir, pressure responsive means within said return line and connected to said movable means for variably controlling the amount of fuel delivered to the combustion engine in accordance with the rate of fuel flow through said flow control means.

2. In a fuel supply system having fuel supply and return lines for injecting fuel into a combustion engine, a fuel tank interconnecting said fuel supply and fuel return lines in said system, a fuel supply pump within said fuel supply line, a metering fuel distributor having a fuel delivery line connecting said engine, said distributor interconnecting said fuel supply and return fuel lines, fuel distributor control means within said fuel return line and connected to said distributor for variably controlling amounts of fuel delivered to said return and delivery lines by said distributor in accordance with minor fuel pressure changes in said distributor control, said pressure changes occurring primarily due to variation in rates of flow through said fuel return line, and a fuel return pump within said fuel return line receiving fuel from said distributor control and control means connected to said return pump for pumping said fuel proportionately to engine speed.

3. In a fuel injection system for a combustion engine having fuel supply, fuel injection and fuel return lines, a metering fuel distributor comprising a chamber having fuel supply, control and injection ports emanating from the chamber, said fuel injection line interconnecting said injection port and a fuel injection nozzle in said engine, a valve having peripheral, angular slotting mounted within said chamber upon an axially shiftable power shaft connected to a driving means of said engine; a cylinder and piston-like distributor control within said fuel return line receiving fuel from said control port, one end of said piston-like control being mounted upon said power shaft, said piston-like control being responsive to transitory fuel pressure variations in said distributor control, said pressure variations occurring primarily due to changes in the rates of flow through said fuel return line, said shaft being axially shifted to vary the amount of fuel injected by said valve in relation to fuel flowing in said return line; a fuel return pump within said fuel return line, said return pump being operatively, adjustable connected to said engine drive means whereby the rate of fuel return flow varies proportionately to the rate of drive of the engine; and, a return pump control interconnecting said return pump and the manifold of said engine, said return pump control comprising a vacuum cylinder operatively connected to said manifold of said engine so that the cylinder vacuum is equivalent to manifold vacuum, and a piston within said cylinder linked to said fuel return pump, said piston responding to manifold vacuum changes to vary rates of pumping of said fuel return pump.

4. In a fuel supply system having fuel supply, delivery and return lines, a metering fuel distributor interconnecting said lines, said distributor comprising a chamber having supply, delivery and control ports, first and second angularly slotted valves within said chamber intermediate said ports for metering fuel to said delivery and control ports, said valves being mounted upon an axially shiftable power-control shaft connected to a drive means; a distributor control cylinder and piston within said fuel return line for receiving fuel from said control port, said shiftable power-control shaft interconnecting said control piston and said valves, said piston being responsive to transitory fuel pressure changes in said distributor control whereby said power-control shaft and said first and second valves are adjusted for varying respectively amounts of fuel supplied to said delivery port and said control port in relation to fuel returned to the area of supply through said return line.

5. A fuel supply system as in claim 4 further comprising a surge line interconnecting an expansion portion of said cylinder and said fuel return line.

6. In a fuel supply system having fuel supply, delivery and return lines, a metering fuel distributor interconnecting said lines, said distributor comprising a chamber having fuel supply, delivery, control, return and surge ports, for a distributor control area and a surge area, said distributor control area interconnecting said return line and receiving fuel from said control port, an angularly slotted, rotatable valve and a piston mounted upon an axially shiftable power-control shaft connected to a drive means, said valve being positioned intermediate said supply, delivery, return and control ports for regulating fuel flowing through said control and delivery ports, said piston being intermediate said supply and surge ports and counterbalancing said valve, said valve having a control head intermediate said supply port and control area shiftably responsive to pressure changes in said distributor control, said pressure changes occurring primarily due to variations in rates of flow through said fuel return line, said variations causing a shift in the axial position of said control head, said power-control shaft, said valve and said piston, whereby the amount of fuel injected is varied in relation to fuel return to the area of supply through said return line.

7. In a fuel supply system for an internal combustion engine having fuel supply, injection and return lines, a metering fuel distributor interconnecting said lines, said distributor comprising a chamber having fuel supply, control circuit, surge, injection, return and control ports, a surge area adjacent said surge port in said chamber and a control area adjacent said control and return ports in said chamber, said control area receiving fuel via said control circuit port, said return line and said control port; a fuel supply pump interconnecting said fuel supply line and a bottom of said chamber, a fuel return pump interconnecting said control area of said chamber and said fuel return line, said fuel return pump varying the rate of fuel return according to engine speed, a return pump control linked to said fuel return pump, said return pump control being operatively connected to an engine intake manifold and variably changing the rate of return pumping according as said manifold vacuum varies; a rotating power shaft synchronously attached to the engine crank shaft and extending through said fuel supply pump, said chamber and said fuel return pump and interposed between said ports within said chamber, a distributor valve with at least one peripheral angular slot mounted upon said power shaft, said valve being configured to rotate within said control circuit port and said injection port portions of said chamber, a control piston mounted upon said power shaft in the control area of said chamber and a surge piston mounted upon said power shaft at the surge area of said valve, said power shaft upon rotation collectively respectively rotating said supply pump, said valve and said return pump, said return pump control varying the rate of return pumping according as vacuum in said manifold varies, whereby said distributor valve shifts axially as said return pump rate varies, whereby the amounts of fuel injected are varied.

8. In a fluid supply system in which metering control is desired, a fluid supply, a primary fluid supply line, a fluid return line, a metering fluid distributor interconnecting said lines through which fluid flows, a fluid use means connected to said primary fluid supply line through said metering fluid distributor and a distributor control means in said return line responsive to the rate of flow in said return line, said distributor control varying the rate of fluid flow through said metering fluid distributor between said primary supply and return lines in accordance with changes in the rate of fluid flow in said return line, said distributor metering and distributing proportionate amounts of fluid to said fluid use means and said distributor control means.

9. The fluid supply system of claim 8 further comprising a return fluid control means within said return line between said distributor control and said fluid supply for regulating the rate of fuel flow in said return line.

10. In a fuel supply system for an internal combustion engine, a fuel supply reservoir, a metering distributor connected between said reservoir and said engine, a first outlet means in said distributor for supplying fuel to said engine, a second outlet means in said distributor, a return fuel line connected between said supply reservoir and said second outlet, means in said metering distributor responsive to the rate of fluid flow in said return line for regulating the flow of fuel from said distributor to said engine and said return line, and a fuel flow control means connected in said return line for regulating the rate of fuel flow in said return line.

11. In a fuel supply system for internal combustion engines having a fuel supply source apart from the engine, a fuel metering distributor connected in circuit with said source and said engine, fuel return means connected between said distributor and said source, a variable distributor control means within said metering distributor responsive to the rate of fuel flow in said fuel return means for regulating the fluid flow to said engine, said distributor simultaneously metering and distributing proportionate amounts of fuel to said engine and to said fuel return means, fuel flow control means connected in said return fuel means for controlling the rate of fuel flow return to said supply source.

12. The apparatus of claim 3 further comprising a restricting orifice means in said return line for matching the pressure effect caused by the fuel injection nozzle.

References Cited in the file of this patent

UNITED STATES PATENTS

| | | |
|---|---|---|
| 2,453,329 | Lee | Nov. 9, 1948 |
| 2,502,997 | Schnaible | Apr. 4, 1950 |
| 2,516,147 | Robinson | July 25, 1950 |
| 2,750,933 | Lauck | June 19, 1956 |
| 2,813,522 | White et al. | Nov. 19, 1957 |
| 2,988,881 | Reggio | June 20, 1961 |